(12) United States Patent
Ryhman et al.

(10) Patent No.: US 7,350,834 B2
(45) Date of Patent: Apr. 1, 2008

(54) COUPLING DEVICE CONSTITUTE TWO HALVES

(75) Inventors: Morgan Ryhman, Anderstorp (SE); Marcus Johansson, Värnamo (SE); Fredrik Stigefelt, Anderstorp (SE)

(73) Assignee: Norma Sweden AB, Stockholm (SE)

( * ) Notice: Subject to any disclaimer, the term of this patent is extended or adjusted under 35 U.S.C. 154(b) by 0 days.

(21) Appl. No.: 10/502,739

(22) PCT Filed: Jan. 22, 2003

(86) PCT No.: PCT/SE03/00097

§ 371 (c)(1),
(2), (4) Date: Jan. 24, 2005

(87) PCT Pub. No.: WO03/074918

PCT Pub. Date: Sep. 12, 2003

(65) Prior Publication Data

US 2005/0121911 A1    Jun. 9, 2005

(30) Foreign Application Priority Data

Mar. 4, 2002    (SE) .................................. 0200631

(51) Int. Cl.
  *F16L 23/00* (2006.01)
(52) U.S. Cl. ...................... 285/406; 285/419
(58) Field of Classification Search ............... 285/406, 285/364, 373, 419, 421
See application file for complete search history.

(56) References Cited

U.S. PATENT DOCUMENTS 4,176,756 A * 12/1979 Gellman ..................... 215/274
4,405,312 A * 9/1983 Gross et al. .................. 604/29
4,432,759 A * 2/1984 Gross et al. ................. 604/411
4,443,031 A * 4/1984 Borsh et al. ................. 285/419
4,452,097 A * 6/1984 Sunkel ....................... 74/502.4
4,473,369 A * 9/1984 Lueders et al. ............. 604/244
4,596,571 A * 6/1986 Bellotti et al. .............. 604/411
4,723,948 A * 2/1988 Clark et al. ................. 604/533
4,829,145 A * 5/1989 Mitchell et al. .......... 174/65 G
4,881,760 A   11/1989 Runkles et al.
5,015,013 A * 5/1991 Nadin ......................... 285/64
5,188,400 A * 2/1993 Riley et al. ................. 285/233
5,277,459 A * 1/1994 Braun et al. ................ 285/419
5,320,391 A * 6/1994 Luthi .......................... 285/365
5,366,263 A * 11/1994 Hendrickson ............... 285/364
5,531,695 A * 7/1996 Swisher ..................... 604/111

(Continued)

FOREIGN PATENT DOCUMENTS

JP        08-152084        6/1996

*Primary Examiner*—James M. Hewitt
(74) *Attorney, Agent, or Firm*—Harness, Dickey & Pierce, P.L.C.

(57) ABSTRACT

A coupling device for holding together a coupling joint. The device may include two coupling halves, which may be articulated relative to one another. The coupling device may be arranged in its active position to engage portions of two interconnected pipes adjacent the coupling joint. One of the coupling halves may be formed with a catch, and the other half with a holding portion that cooperates with the catch. One of the halves may be provided with at least one protrusion and the other half with at least one recess. The at least one protrusion and the at least one recess may be arranged to cooperate and guide the catch into a position as to engage the holding portion.

10 Claims, 9 Drawing Sheets

U.S. PATENT DOCUMENTS

| | | | |
|---|---|---|---|
| 5,620,210 A | * | 4/1997 | Eyster et al. ................. 285/81 |
| 5,647,612 A | * | 7/1997 | Yoshida et al. ............... 285/13 |
| 6,099,519 A | | 8/2000 | Olsen et al. |
| D484,592 S | * | 12/2003 | Ryhman et al. ............ D24/128 |
| 6,832,791 B2 | * | 12/2004 | Legeai et al. ................ 285/373 |
| 6,908,123 B2 | * | 6/2005 | Le ............................ 285/402 |
| 6,913,294 B2 | * | 7/2005 | Treverton et al. ........... 285/406 |
| 6,916,051 B2 | * | 7/2005 | Fisher ........................ 285/373 |

* cited by examiner

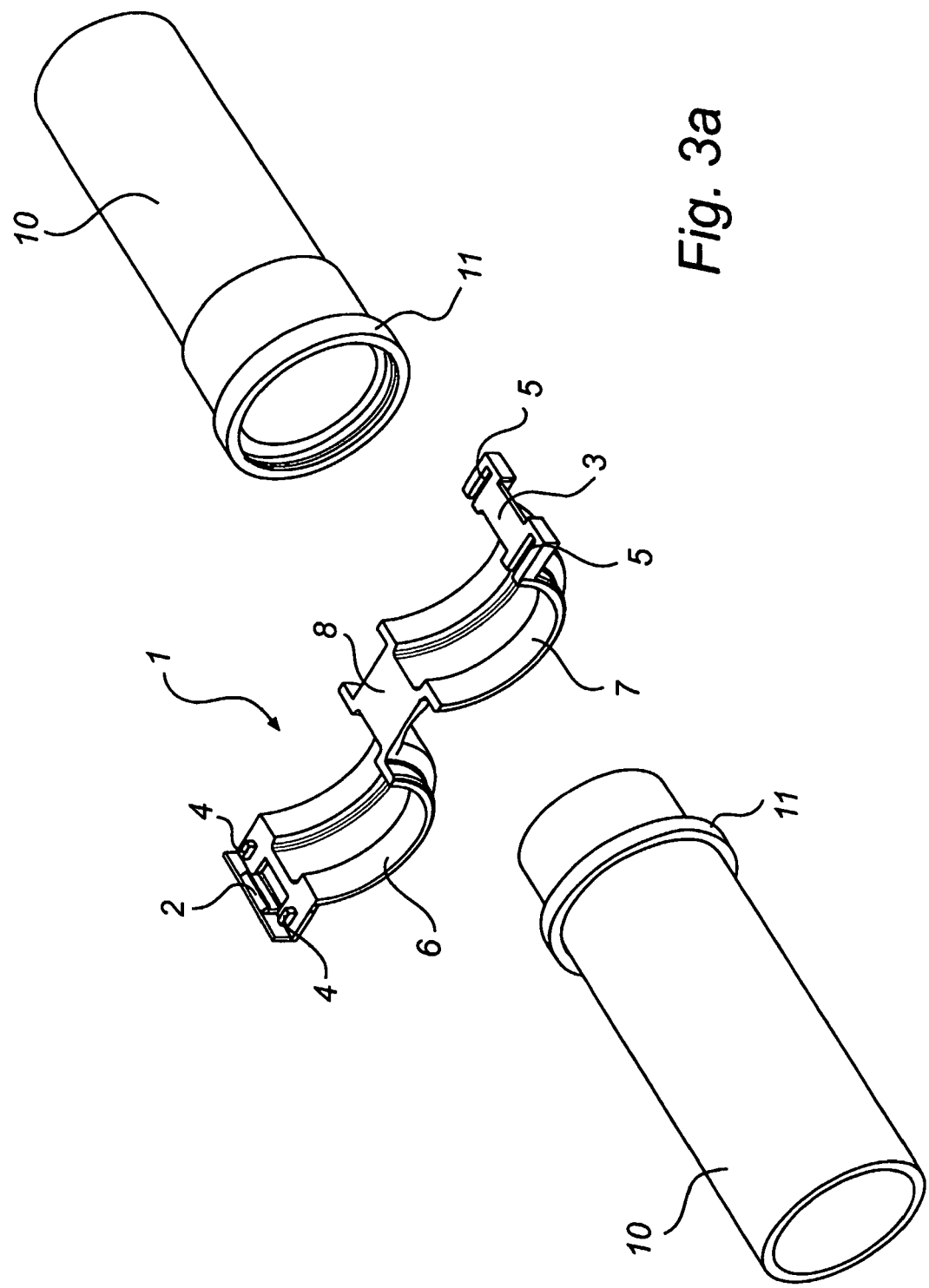

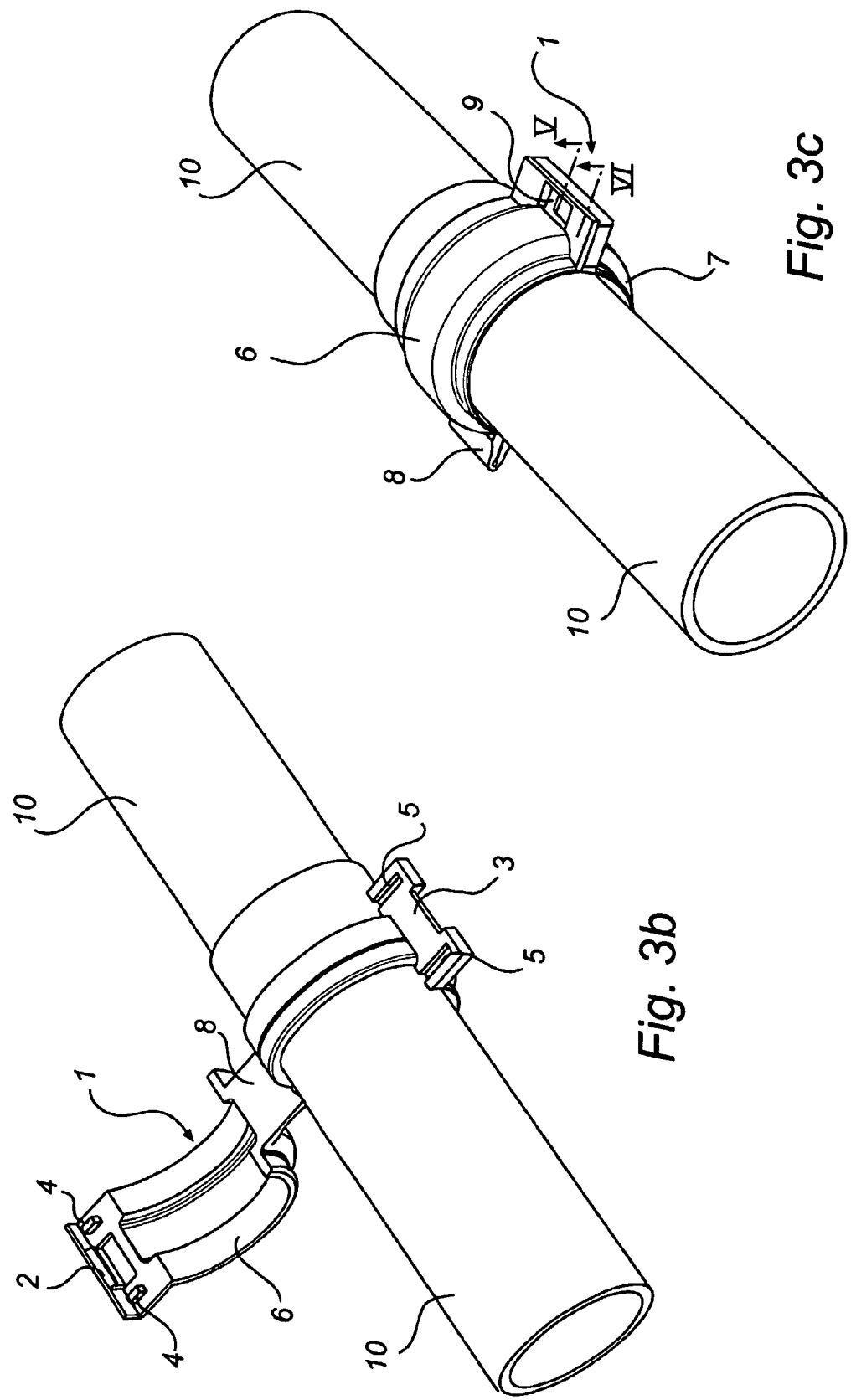

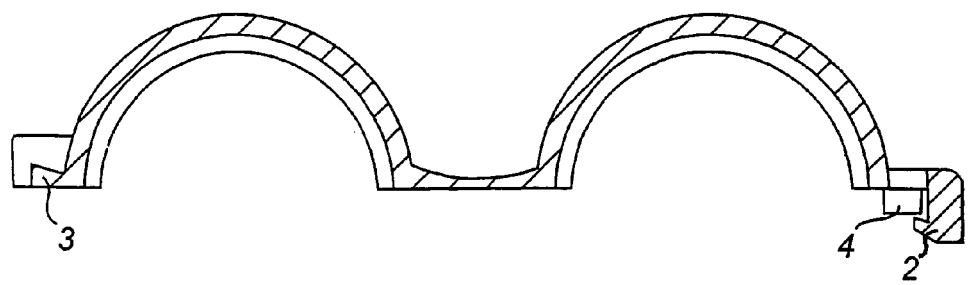
Fig. 4
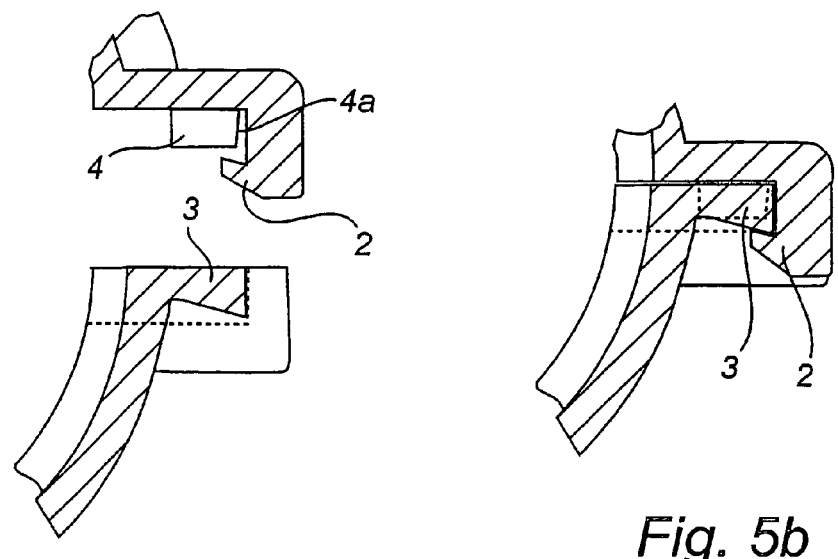
Fig. 5a
Fig. 5b
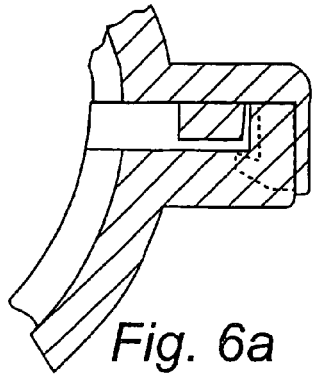
Fig. 6a
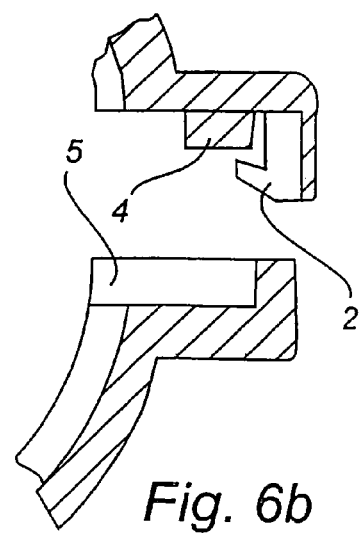
Fig. 6b

COUPLING DEVICE CONSTITUTE TWO HALVES

TECHNICAL FIELD

The present invention relates to a coupling device for holding together a coupling joint, said device comprising two coupling halves, which are articulated relative to one another and which may be joined together, said coupling device arranged in its active position to engage portions, preferably radial protrusions, of two interconnected pipes adjacent said coupling joint.

BACKGROUND OF THE INVENTION

Coupling devices of the kind outlined above are well known. Other examples are coupling devices of hose-coupling type, i.e. in the form of a strap that is tightened by means of a screw. One problem found in coupling devices available on the market today is, however, that they are comparatively inconvenient to put in place, particularly in narrow spaces. Another problem is the difficulty to establish whether the coupling is correctly mounted, i.e. whether the coupling device grasps the coupling joint sufficiently.

SUMMARY OF THE INVENTION

The object of the present invention is to eliminate the above referred-to problems and also in other respects to provide an improved coupling device.

This object is now achieved in accordance with the teachings of the invention by means of a device possessing the characteristic features defined in the appended claim 1, preferred embodiments being defined in the subsequent claims 2-9.

Accordingly, in the inventive coupling device one of the coupling halves is formed with a catch and the other one with a holding portion that co-operates with the catch, one of the halves being provided with at least one protrusion and the other one with at least one recess, said protrusion and said recess arranged to co-operate to guide the catch on one of the coupling halves into a position, wherein it engages the holding portion on the other half. Owing to this arrangement, the catch on one of the coupling halves is locked against radial movements relative to the other half on which the holding portion is formed. Upon interconnection of the two halves, the catch is forced to flex radially outwards in order to engage the holding portion and it snaps into position when correctly located.

In accordance with a preferred embodiment of the invention, said protrusion is bevelled at least on one of its sides to facilitate its being fitted into said recess as the two coupling halves are being joined together. The bevelled side allows the protrusion to be more easily guided into the recess as the catch flexes radially outwards just prior to the catch snapping into engagement with the holding portion.

In accordance with another preferred embodiment of the invention it is instead said recess that is bevelled at least on one side for more convenient fitting together of recess and protrusion as the two coupling halves are being joined together.

According to yet another preferred embodiment of the invention said recess and said protrusion are bevelled at least on one side each for more convenient fitting together of recess and protrusion as the two coupling halves are being joined together.

In accordance with another preferred embodiment of the invention at least either the catch or the holding portion is bevelled in order to facilitate the joining-together of the two coupling halves. As the halves are being joined together the bevel allows the catch to slide easily across the holding portion to the snap-latch position.

According to a preferred embodiment of the invention the two coupling halves are integrally held together in a hinge. The advantage of this arrangement is that the coupling device constitutes one single piece with consequential easier manipulation for instance upon application of the coupling device. The fact that the coupling device may be formed as one single piece is advantageous also from a manufacturing point of view and thus provides an economical solution.

In accordance with another preferred embodiment of the invention the hinge is radially displaced in the mounted position of the device. The radial displacement of the hinge adds some flexibility to the coupling, which is an advantage when the two interconnected pipes expand and contract in response to changing temperatures. A coupling device formed with a radially displaced hinge thus adapts itself to changing pipe diameters. Also some dimensional inaccuracy in the pipes thus may be compensated for.

According to yet another preferred embodiment of the invention said coupling halves are formed with holding faces that are turned in opposite directions to be joined together to interengagement position. These designing features make it possible to use e.g. pliers to mount the coupling device correctly.

In accordance with another preferred embodiment of the invention said catch, when in engagement with the holding portion, is received in a recess in said portion for catch-protection purposes. This arrangement offers the catch additional protection against inadvertent disengagement.

BRIEF DESCRIPTION OF THE DRAWINGS

The invention will be described in the following in more detail by means of one embodiment with reference to the accompanying drawing figures. In the drawings:

FIGS. 3a-3c show the interconnection of two pipes by means of a coupling device in accordance with the present invention.

FIG. 4 is a cross-sectional view taken centrally along line IV-IV of FIG. 1.

FIGS. 5a, 5b are part sectional views through a locking portion along line V in FIG. 3c, in the open and closed positions, respectively.

FIGS. 6a, 6b are part sectional views through a locking portion along line VI in FIG. 3c, in the open and the closed positions, respectively.

DETAILED DESCRIPTION OF PREFERRED EMBODIMENTS

Figure 1:
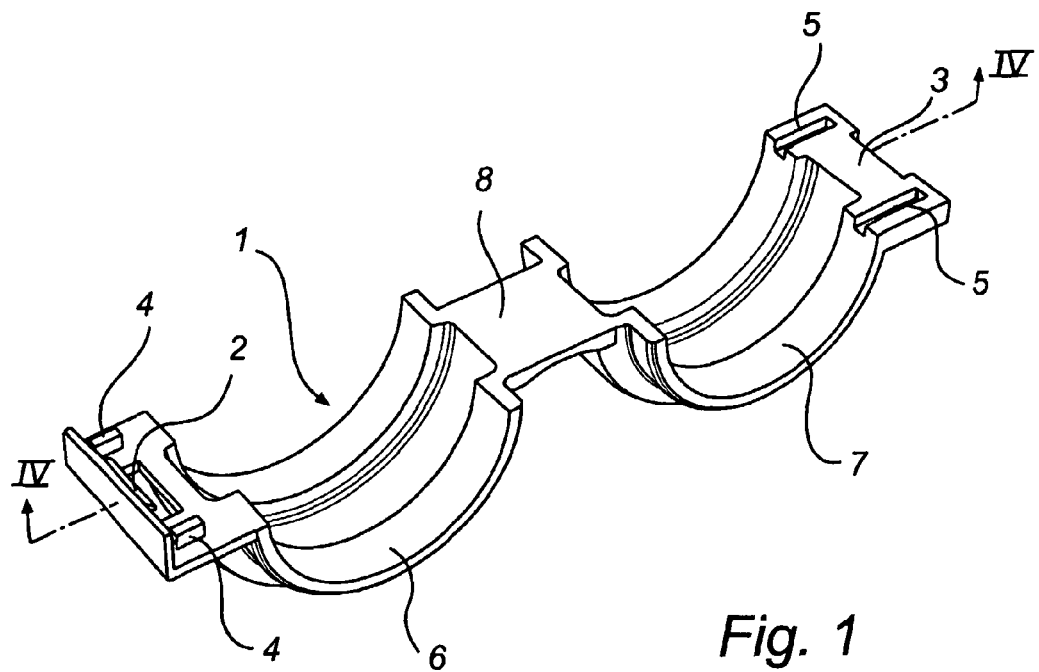
FIG. 1 is a perspective view of a coupling device in accordance with the invention.
Figure 2:
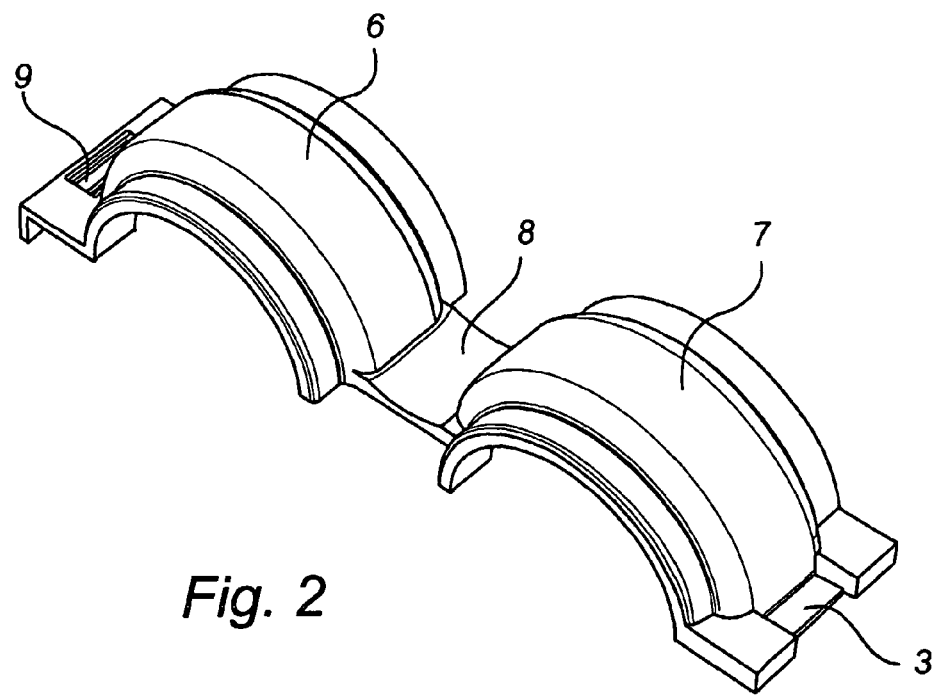
FIG. 2 is a perspective view of the coupling device of FIG. 1 but seen from a different angle.

The coupling device 1 shown in FIGS. 1 and 2 comprises a catch 2 and a holding portion 3. Furthermore, the coupling device 1 is formed with two protrusions 4 and two recesses 5. In a preferred embodiment the catch 2 is formed on the same coupling-device half 6 as the protrusions 4. Accordingly, the holding portion 3 is formed on the coupling-device half 7 having the recesses 5. The coupling halves 6, 7 are held together via a hinge 8. The entire coupling device 1 preferably is manufactured as one integral piece.

Figure 7:
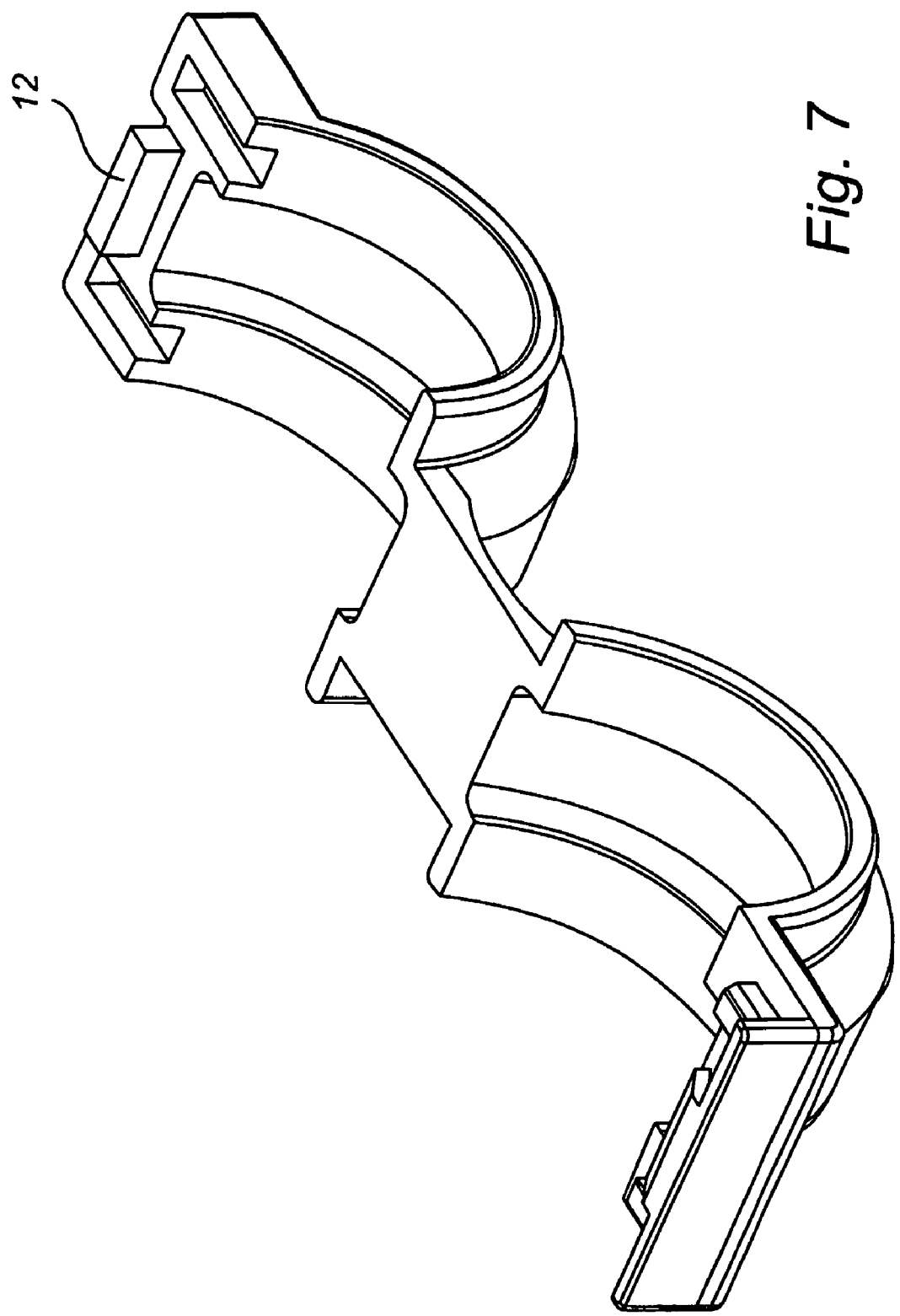
FIGS. 7 and 8 show an alternative embodiment of the invention.
Figure 8:
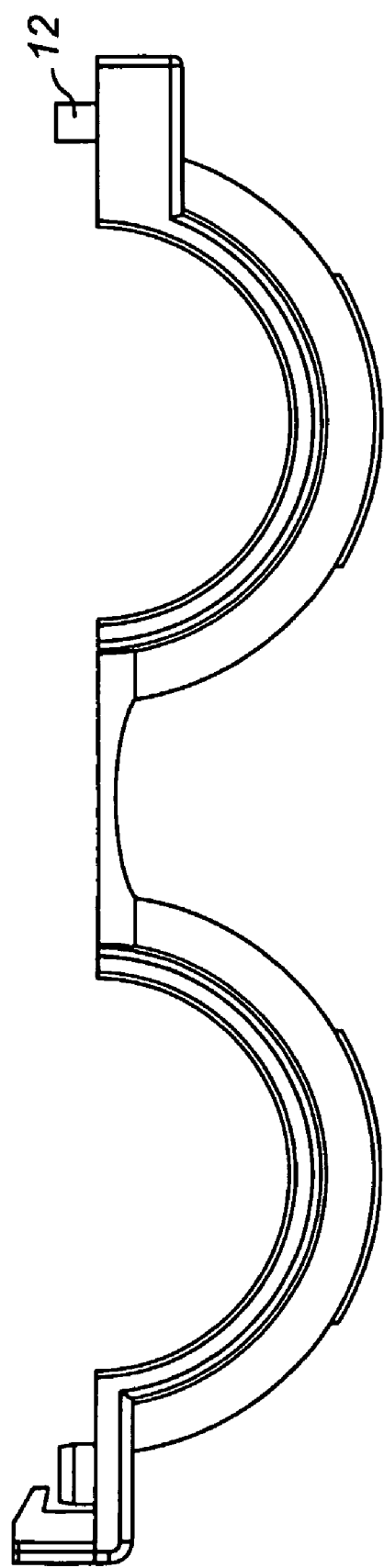

To couple together two pipes 10 (see FIGS. 3a-3c), the pipes 10 are brought together in such a manner as to ensure that flanges 11 formed on the pipes 10 will be positioned in abutting relationship. The coupling device is thereafter placed in a position, wherein the flanges 11 are received inside the coupling device 1, whereupon the coupling halves 6, 7 are joined together at the ends opposite the hinge 8. As the free ends of the coupling device are being joined together, the catch 2 is forced to flex outwards, allowing it to slide across the holding portion 3 and thereafter to snap into engagement behind the holding portion 3. Further, the coupling halves 6, 7 are formed with holding faces joined together in an inter-arrangement position when turned in the opposite directions. The protrusions 4 together with the catch 2 and the holding portion 3 serve to lock the free ends radially in their joined-together position, ensuring a high degree of safety against inadvertent disengagement of the coupling. Further, the catch 2 while engaged with the holding portion 3 is protected when received in the recess 5 in the holding portion 3. In accordance with one preferred embodiment the device is formed with a second recess 9 by means of which it becomes possible to indicate whether the correct coupling position is obtained, such as for example by the provision of a colored marker (not shown) or a marker protrusion 12 formed on the holding portion and projecting into the recess (see FIGS. 7 and 8) in such a manner that when the correct coupling position is achieved, the protrusion is clearly visible in the second recess 9.

As will be appreciated, a great many modifications of the above embodiment of the invention are possible within the scope of protection of the invention as defined in the appended claims. As described above the two coupling halves 6, 7 could for instance be of different sizes, i.e. one half could extend over e.g. 210 degrees around the pipes 10 while the second half extends over the remaining 150 degrees. Another possible modification is to form the protrusions 4 on the same coupling half as the holding portion 3. Yet another possibility is to use, instead of two protrusions 4 and two recesses 5 and one catch 2 and one holding portion 3, respectively, to use two catches 2 and one recess 5. Obviously, other combinations of the number of catches, holding faces 3, protrusions 4 and recesses 5 likewise are possible. In addition, the coupling device 1 could be used to interconnect two pipes 10 formed with grooves instead of with flanges 11. It is not either necessary that the flanges 11 or the grooves extend around the entire perimeter of the pipes 10.

Preferably, the protrusions 4 and/or the recesses 5 are bevelled in such a manner that a wedging effect is obtained serving to guide the two coupling halves 6, 7 into the intended position of engagement, i.e. to orientate the halves into a position, wherein the holding portion 3 is firmly guided in underneath the catch 2 in the radial direction, preferably also in the axial direction.

From FIGS. 5a,b and 6a,b appears most clearly the manner in which, as the two coupling halves are clamped together, the wedge-shaped bevelled end edge 4a of the guide protrusion 4 by means of a guided sliding motion forces the radially outer edge of the holding portion 3 into secure engagement beneath the nose portion of the catch 2.

As will be appreciated it is within the scope of protection of the invention to provide a similar wedge-shaped guide edge at the rear edge of the recess to achieve a similar guide movement towards the position of engagement of the two halves of the clamp. Similar wedge-shaped faces could likewise be provided in the recess 5 as well as on the protrusion 4.

Figure 9:
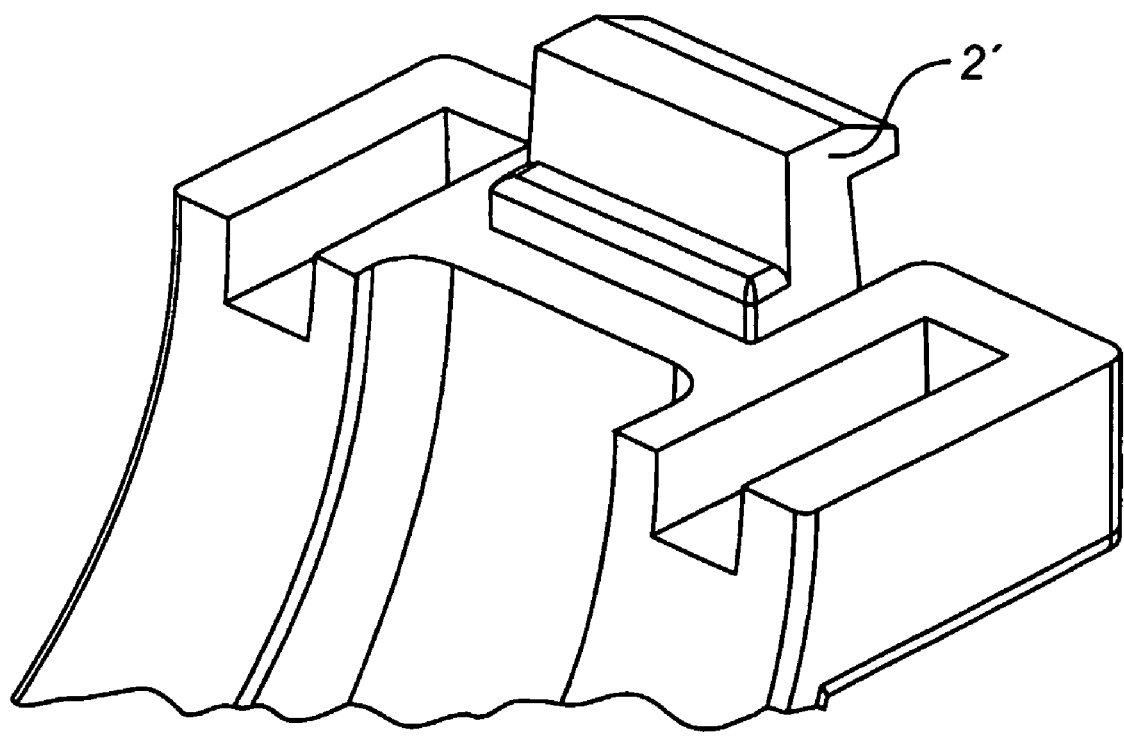
FIGS. 9-11 show a further alternative embodiment of the invention.
Figure 10:
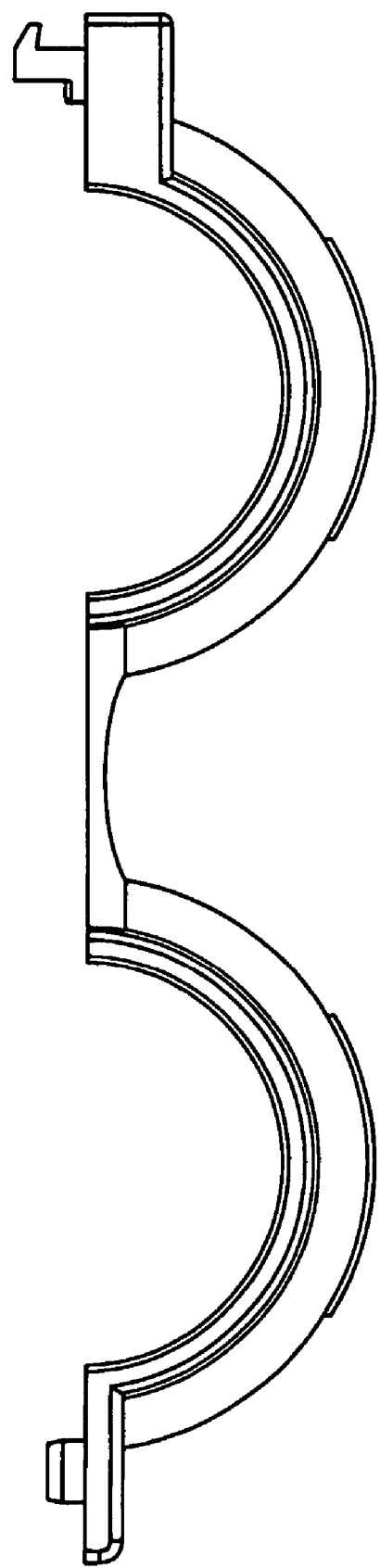
Figure 11:
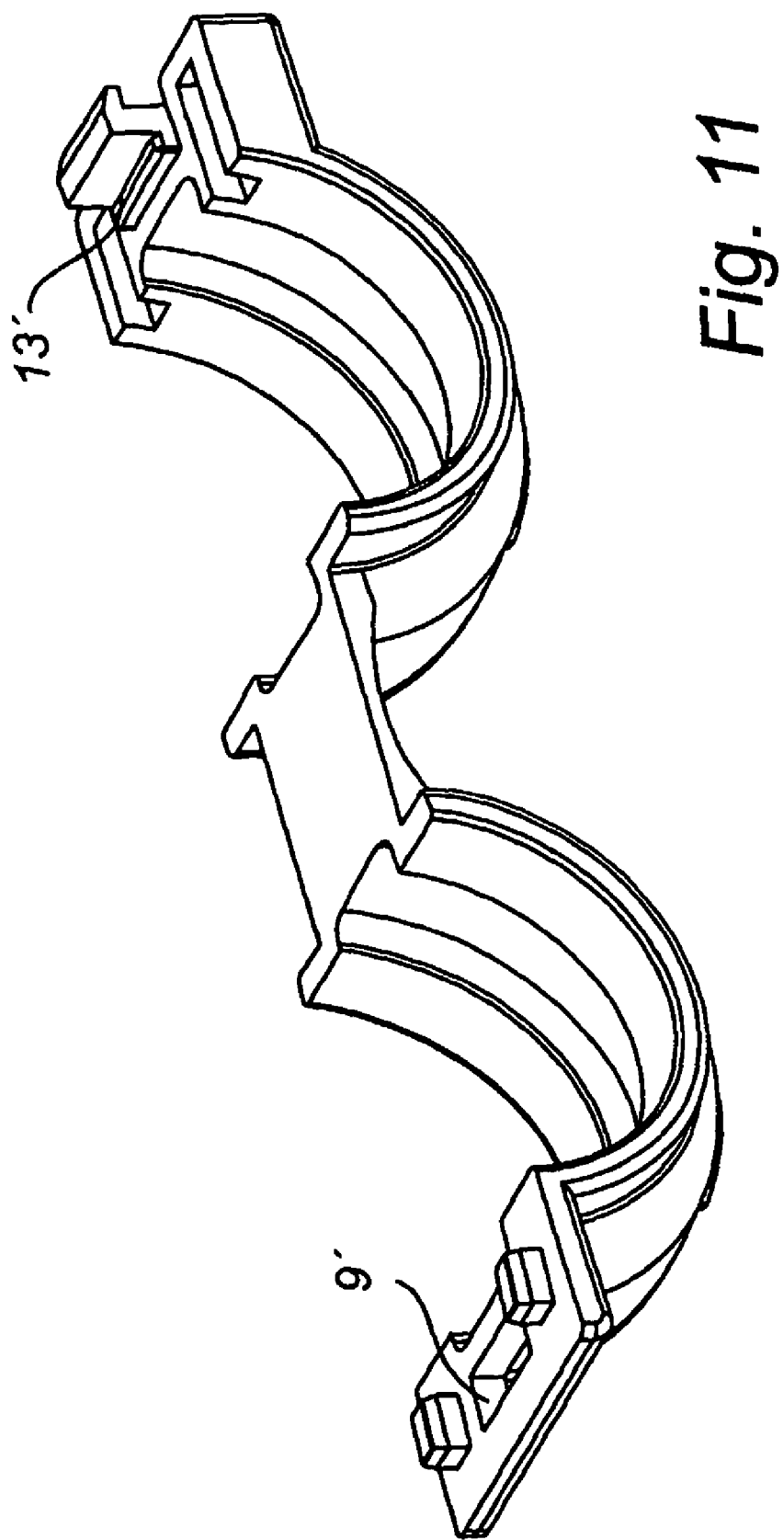

FIGS. 9-11 show an alternative embodiment wherein the nose portion of the catch is turned radially outwards. In this case the catch 2' extends through the recess 9' and engages its radially outer edge in the locking position. In FIG. 11, numeral reference 13' designates a marker protrusion corresponding to marker protrusion 12 in FIG. 8.

The invention claimed is:

1. A coupling device for holding together a coupling joint, said device comprising:
   two coupling halves which are articulated relative to one another and which may be joined together, said coupling device being arranged in an active position to engage portions of two interconnected pipes adjacent said coupling joint,
   wherein one of the coupling halves is formed with a catch and the other half with a holding portion that cooperates with the catch, one of the halves being provided with at least one protrusion that protrudes from said one of the halves in a first direction and the other half with at least one recess, said at least one protrusion and said at least one recess arranged to cooperate to guide the catch into a position so that the at least one protrusion engages the holding portion, at least one of the at least one protrusion and the at least one recess being beveled on at least one side to guide the two coupling halves into an intended position of engagement by a wedging effect, said wedging effect bringing said coupling halves to move in relation to each other in a radial direction substantially perpendicular to the first direction, and the distance between the two coupling halves in the radial direction decreases due to the wedging effect as the two coupling halves are brought into engagement.

2. The coupling device as claimed in claim 1, wherein said at least one protrusion is beveled on at least one of said at least one side to facilitate fitting of said at least one protrusion into said at least one recess as the two coupling halves are being joined together.

3. The coupling device as claimed in claim 1, wherein said at least one recess is beveled on at least one side for more convenient fitting together of said at least one recess and said at least one protrusion as the two coupling halves are being joined together.

4. The coupling device as claimed in claim 1, wherein said at least one recess and said at least one protrusion are beveled on at least one side each for more convenient fitting as the two coupling halves are being joined together.

5. The coupling device as claimed in claim 1, wherein the catch or the holding portion is beveled in order to facilitate the joining together of the two coupling halves.

6. The coupling device as claimed in claim 1, wherein said two coupling halves are integrally held together by a hinge.

7. The coupling device as claimed in claim 6, wherein said hinge is radially displaced in a mounted position of the device.

8. The coupling device as claimed in claim 1, wherein said coupling halves are formed with holding faces so as to be joined together in an interengagement position, when turned in opposite directions.

9. The coupling device as claimed in claim 1, wherein said catch, while engaged with the holding portion, is received in a recess in said holding portion in order to protect the catch.

10. The coupling device as claimed in claim 1, wherein the coupling device is configured to engage radial protrusions on the portions of the interconnected pipes adjacent said coupling joint.

* * * * *